(12) United States Patent
Inoue

(10) Patent No.: US 6,733,014 B2
(45) Date of Patent: May 11, 2004

(54) BRUSH SEAL

(75) Inventor: Hideyuki Inoue, Sakado (JP)

(73) Assignee: Eagle Industry Co., Ltd., Tokyo (JP)

( * ) Notice: Subject to any disclaimer, the term of this patent is extended or adjusted under 35 U.S.C. 154(b) by 0 days.

(21) Appl. No.: 10/255,670

(22) Filed: Sep. 27, 2002

(65) Prior Publication Data

US 2003/0062684 A1 Apr. 3, 2003

(30) Foreign Application Priority Data

Sep. 28, 2001 (JP) ........................................ 2001-301190

(51) Int. Cl.$^7$ ................................................ F16J 15/44
(52) U.S. Cl. ....................... 277/355; 277/415; 277/547
(58) Field of Search ................................ 277/355, 543, 277/547, 548, 415

(56) References Cited

U.S. PATENT DOCUMENTS

| | | | | |
|---|---|---|---|---|
| 2,058,993 A | * | 10/1936 | Keller | 277/413 |
| 2,840,343 A | * | 6/1958 | Brandt, Jr. et al. | 415/173.4 |
| 3,719,365 A | * | 3/1973 | Emmerson et al. | 277/414 |
| 3,970,319 A | * | 7/1976 | Carroll et al. | 277/414 |
| 4,022,948 A | * | 5/1977 | Smith et al. | 428/542.8 |
| RE30,206 E | * | 2/1980 | Ferguson et al. | 415/173.7 |
| 4,204,629 A | * | 5/1980 | Bridges | 228/160 |
| 4,358,120 A | * | 11/1982 | Moore | 277/355 |
| 5,031,922 A | * | 7/1991 | Heydrich | 277/355 |
| 5,042,823 A | * | 8/1991 | Mackay et al. | 277/355 |
| 5,071,138 A | * | 12/1991 | Mackay et al. | 277/303 |
| 5,108,116 A | * | 4/1992 | Johnson et al. | 277/355 |
| 5,183,197 A | * | 2/1993 | Howe | 228/160 |
| 5,316,318 A | * | 5/1994 | Veau | 277/355 |
| 5,944,320 A | * | 8/1999 | Werner et al. | 277/355 |
| 5,951,892 A | * | 9/1999 | Wolfla et al. | 219/121.69 |
| 6,012,723 A | * | 1/2000 | Beeck | 277/355 |

* cited by examiner

Primary Examiner—Alison K. Pickard
(74) Attorney, Agent, or Firm—Arent Fox Kintner Plotkin & Kahn, PLLC

(57) ABSTRACT

The brush section of a brush seal is protected from damages during installing work. It is constituted such that a brush seal unit has, at the free end of the brush section, at least one ablative plate section formed therewith and has a thin groove at the boundary between the brush section and the ablative plate section; and the ablative plate section is broken off before mounting the brush seal between two components.

3 Claims, 11 Drawing Sheets

BRUSH SEAL

BACKGROUND OF THE INVENTION

1. Field of the Invention

The present invention relates to a strip-like brush seal having a plurality of thin plates each of which is processed to have thin, cantilever beams at its one end and to a brush seal device, for sealing between a rotational shaft and a mating component movable relatively, for example in an aircraft and a gas turbine.

More particularly, the present invention relates to a technical field of a brush seal having thin beams that are protected from having scratches or damages.

2. Description of the Related Art

As shown in FIG. 8, there exists a brush seal device 100 as a prior art of the present invention.

FIG. 8 is a sectional view of a brush seal device 100 mounted between a rotational shaft 120 and a casing 110 through which the rotational shaft 120 passes. The casing 110 is a component of a steam turbine or gas turbine. The brush seal device 100 seals fluid by separating the casing 110 and the rotational shaft 120.

In FIG. 8, the brush seal device 100 is formed in a ring shape and attached to a channel section 112 of the casing 110. Main components of the brush seal device 100 are a brush seal 109, a back plate 102 and a retaining plate 103. In the brush seal 109, a number of bristles 101 are formed into a bundle, which is in turn arranged circumferentially in the form of a wall. The bristles 101 are welded together at their outer ends to form an attachment section 104. The free end face 105 as the other end of the brush seal 109 faces the rotational shaft 120.

The diameter of each bristle 101 used in general is 0.02 to 0.5 mm. However, its sealing ability is poor because the bristle 101 is linear. In order to overcome such a drawback the thickness of the bundle of bristles 101 must be increased and thus tens of thousands or hundreds of thousands of bristles are necessarily used.

For such a brush seal 109 as described, countless number of these bristles 101 must be cut to has uniform length and then aligned circumferentially. it is therefore difficult to align them precisely. Further, it is also difficult to assemble with uniform accuracy in mass production. This causes defects.

An annular back plate 102 is disposed on one side face of the brush seal 109 with its side face 108 contacting the one side face of the brush seal 109 and bears the bristles 101 against the action of the sealed fluid pressure. A retaining plate 103 formed as a ring plate is disposed integrally on the other side face of the brush seal 109 to sandwich, in cooperation with the back plate 102, the brush seal 109 on its attachment section 104 side. The retaining ring 103 has a small thickness in its radial direction so that the brush seal 109 is exposed to allow to deform itself, corresponding to the contact of the rotational shaft 120 therewith.

The back plate 102, the attachment section 104 of the brush seal 109 and the retaining plate 103 are welded, with the attachment section 104 being located between the others, to form a connecting section 106. The welded components are thermally deformed due to different materials among them and then some rework will be required, resulting in the increase of processing cost.

FIG. 9 is a partial front view, showing a state that the brush seal 109 fits normally without oscillation of the rotational shaft 120, as shown by an actual line in FIG. 8. The bristles 101 fit and extend straight, while incline in the rotating direction with respect to the radial direction of the rotational shaft 120. Accordingly, after completion as a brush seal 109, the fitting surface of the free end 105 is precisely finished so as to fit the rotational shaft 120 normally, as shown FIG. 11, which is a perspective view of the brush seal 109, seen from the inner circumferential side thereof.

It is also difficult to process the free end 105 because the number of bristles in the form of a bundle is extremely large, such as several ten thousands and they are apt to deform. Furthermore, when the brush seal 109 having a finished free end 105 is, for example mounted, each bristle is deformed easily if it contacts or strikes any other parts. Such deformation will adversely affect on the sealing ability.

When the rotational shaft 120 contacts the free end 105 of the brush seal 109 as shown in FIG. 10, the brush seal 109 is pressed against the rotational shaft 120, while its tilt angle is increased. During this state, the contact of the brush seal 109 with the rotational shaft 120 will be facilitated if there is some defective deformation at the free end 105 of each bristle 101, resulting in its rapid wear.

In this state, as shown in FIG. 8, if the pressure of the sealed fluid is a high pressure P1, the differential pressure (P1–P2) between P1 and a low pressure P2 is increased and the sealing ability is worsened due to the deformation and wear on the free end 105.

In the brush seal 2 constituted as described, each bristle 101 is a thin wire and its free end 105 is therefore apt to deform. During fabrication of the brush seal 2, the free end 105 of the bristle may be deformed. Further, if it were not deformed during fabrication then the free end 105 might be bent when the brush seal 2 is installed on the casing 130.

Also, it is difficult to finish exactly the end face of the free end 105 of the brush seal 2 so as to fit the rotational shaft 120, resulting in the increase of processing cost.

Additionally, it is also difficult to weld the attachment section while the inner diameter formed by the end face of the free end 105 is made uniform. Because several ten thousands of bristles 101 are required to constitute a brush seal.

The present invention has been made in consideration of the problems as mentioned above, and technical problems of the invention are to allow to fabricate a brush seal unit without damages on the brush section of the brush seal and also allow to pile the brush seal units without damages and bent thereon.

Further technical problems of the present invention are to allow to provide a thin elastic wire capable of elastically deforming, corresponding to the contact of the brush seal with the rotational shaft and also allow to assemble the brush seal unit without damages on the brush section, even if thin wires are employed. Further yet technical problems are to improve the yield of material for fabricating the brush seals and to increase processing accuracy thereof.

Still other technical problems are to provide a brush seal with good ability of the brush seal to follow in response to the relative displacement between the brush seal and the outer circumference of the rotational shaft for improving the sealing ability and to improve the sealing ability of the contact or proximity between the brush seal and the rotational shaft.

SUMMARY OF THE INVENTION

The present invention has been made to solve the problems as mentioned above, and technical means for solving the problems are constituted as below.

A brush seal of first preferred embodiment according to the present invention is a brush seal mounted on one of two components that are relatively rotated, for sealing the clearance given between the two components, comprising: a plurality of the brush seal units, each having a strip-like brush section on the side facing the other component and having a base plate section on the side opposing the brush section side, the brush section being formed with thin beams each of which is between two slits, and the base plate section being fixed to the one component; the brush seal unit having, at the free end of the brush section, an ablative plate section integrally formed therewith and having a thin groove at the boundary between the brush section and the ablative plate section; wherein the ablative plate section is broken off at the groove before mounting the brush seal to be placed between the two components.

In the brush seal of the present invention, an ablative plate section is formed together with the free end of the brush section in the brush seal unit, thereby to allow to protect the brush section. In other words, a number of thin beams are prevented from bending if the brush section strikes and contacts other members.

Furthermore, a groove is formed at the root of the ablative plate section such that the thickness of its bottom wall is processed to be thin with half-etching process. Accordingly, the brush seal unit or the brush seal can be obtained by bending to break off the ablative plate section when the brush seal units are piled, or when the brush seal is installed on the rotor as a component.

Additionally, it is allowed to improve processing accuracy in the fabrication of the brush seals because they are made from a thin plate and also allowed to mount the brush seal extremely easily.

DETAILED DESCRIPTION OF THE INVENTION

Some preferred embodiments of the brush seal devices of the present invention will be described hereinafter in detail with reference to the accompanying drawings. Those drawings herein are not inexact ones for a patent application but design drawings with exact features.

Figure 1:
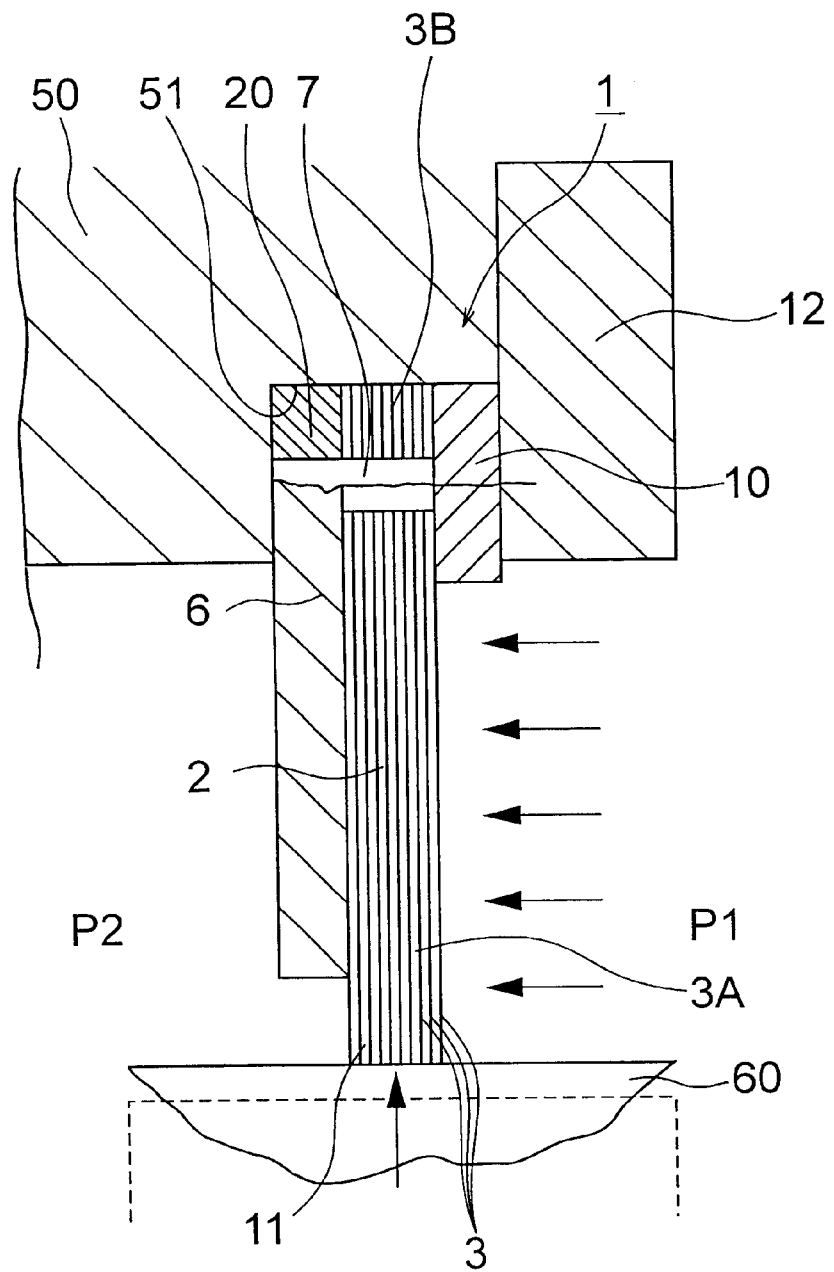
FIG. 1 is a sectional view, showing in half a first embodiment of a brush seal device according to the present invention.

FIG. 1 is a sectional view, showing in half a first embodiment of a brush seal device according to the present invention This brush seal device is an example, that is disposed for sealing the clearance between a casing 50 and a rotor 60 of a gas turbine to separate into a high pressure P1 side and a low pressure P2 side.

In FIG. 1, the reference numeral 1 denotes a brush seal device. A fixing section 20 at the outer circumferential side of the brush seal device 1 is sandwiched to mount, from one side, to a step 51 located in an inner circumferential surface of the casing 50 as one of two components, through an attachment part 12. The free end 11 at the inner circumferential side of the brush seal device 1 contacts the opposite outer circumferential surface of the rotor (rotational shaft) 60 as the other component, or is located closer to the same. Thus, the brush seal device 1 seals fluid to be sealed at the high pressure P1 side.

Main components of the brush seal device 1 are a brush seal 2, a back plate section 6 and a retaining section 10.

Figure 2:
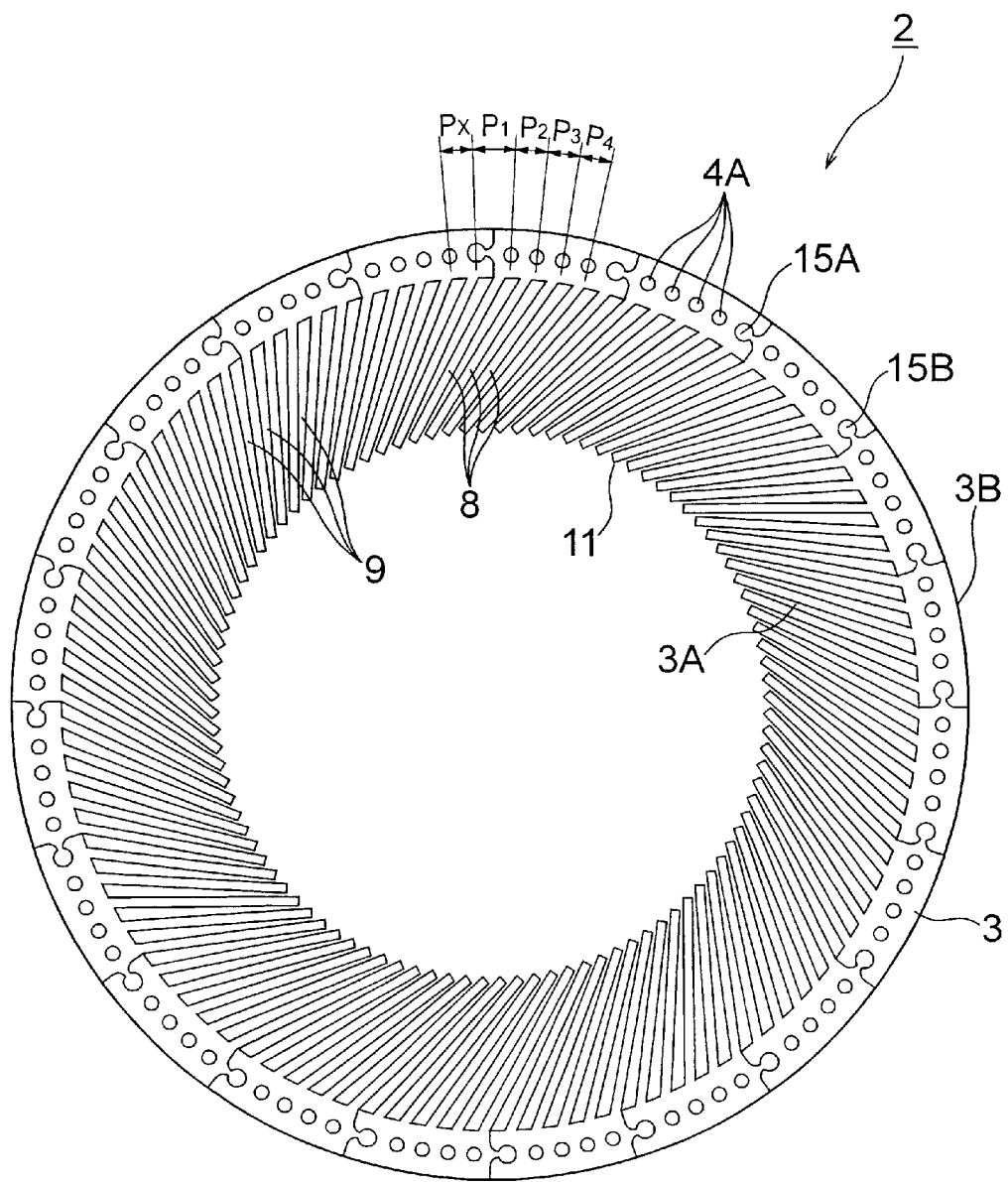
FIG. 2 is an axial front view of the brush seal shown in FIG. 1.

Among them, the brush seal 2 is made by piling thin brush seal units 3 made from a thin plate as shown in FIG. 2. The brush seal unit 3 is formed in an annular body by connecting both ends of a number of modular plates 5 shown in FIG. 3 or 5. The modular plate 5 in FIGS. 3 and 5 will be described later.

The brush seal unit 3 is processed to have slits 9 that incline toward the rotational direction of the rotor 60 at the inner circumferential side in an annular shape, and thus each beam 8 is formed between two slits 9. The thin beams 8 and slits 9, as a whole, forms a brush section 3A in the form of a strip. The brush seal unit 3 has a base plate section 3B and is mounted to the casing 50 at the outer peripheral of the brush section 3A.

Each thin beam 8 formed between slits 9 constituting the brush section 3A of the brush seal unit 3 is shaped in a rectangular in its cross section. Then a plurality of brush seal units 3 are piled and arranged in the axial direction of the rotor 60 to form a wall.

The brush seal unit 3 as an example described above is obtained such that a thin plate having the thickness between 0.005 to 0.008 mm is processed to have slits 9 forming gaps and thin beams 8 therebetween on its inner circumferential side. The cross section of the thin beam 8 is a rectangular (rectangular if the thin plate has the width larger than the thickness, while be a square if the width and thickness are same.), and one side of the cross section is (0.2–0.005)×(0.3–0.008)mm long, preferably (0.15–0.008)×(0.2–0.01) mm long. Its length is within 5–50 mm. The sectional shape of the thin beam 8 is not limited to be rectangular. Additionally, any of oval, trapezoid and triangle in cross section may be used.

The wall thickness of the brush seal 2 is determined to be 0.5–5 mm; however, it shall be determined, depending on the pressure of the sealed fluid or design conditions.

The base plate section 3B of the brush seal unit 3 is formed outside of the brush section 3A in the shape of a thin annular sheet. In the base plate section 3B is circumferentially provided exemplary positioning holes 4A. Pitches for those positioning holes 4A are slightly different each other. Such differences are determined in the design process to obtain such a dimensional relationship that if one brush seal unit 3 is piled on another one with the positioning holes 4A of the one brush seal unit 3 being displaced by one or two pitches from the positioning holes 4A of the another one and aligned with positioning holes 4A each other, then slits 9 of the one brush seal unit 3 overlap the thin beams 8 of the another one, respectively. In other words, the slits 9 in the piled brush seal units 3 are arranged in a zigzag fashion.

When the brush seal 2 is formed, the brush seal units 3 are piled to a thickness, depending on the sealing ability as desired. There are formed positioning holes 4 in the base plate section 3B of the brush seal unit 3 to be piled. Accordingly, it is allowed to assemble easily and precisely by aligning a different pitched positioning hole 4 with a positioning pin 7 of the back plate 6, regardless of the number of piled brush seal units 3.

Next, a method of manufacturing the brush seal unit 3 will be described.

The brush seal unit 3 is formed from a thin plate of steel, stainless steel, nickel-base alloy, ceramic, or the like. The brush seal unit 3 is processed by micro-fabrication under process conditions suitable to a thin plate that the inventors found, such as wire electric discharging, etching, laser and electronic beam processes. Accordingly, even a thin plate can be processed precisely and high accuracy in dimension can be achieved.

Figure 3:
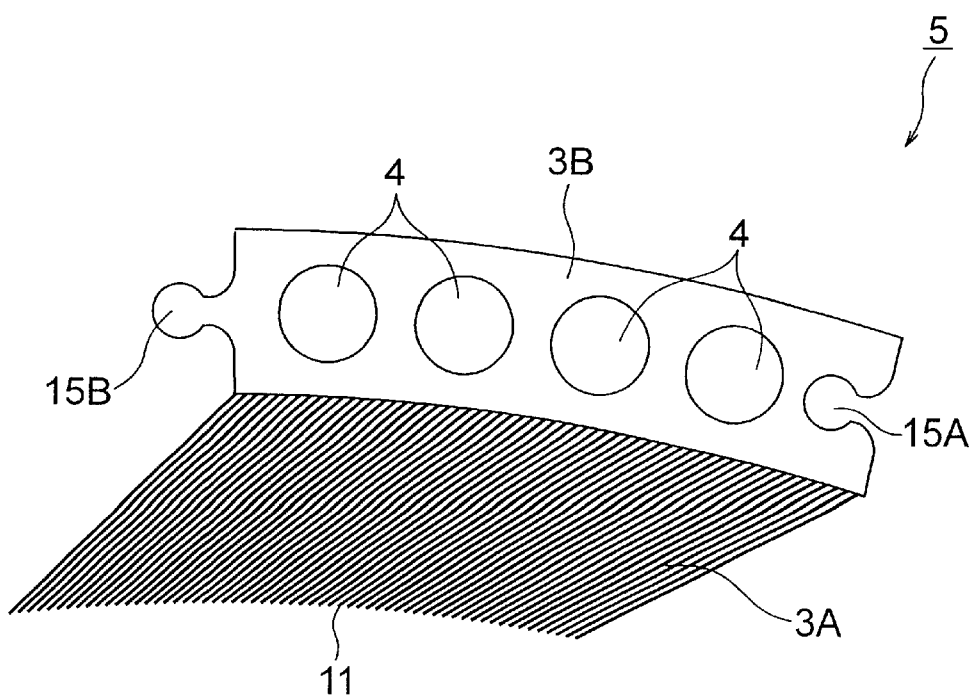
FIG. 3 is a plan view of first example of a modular plate constituting a brush seal unit relating to the present invention.
Figure 4:
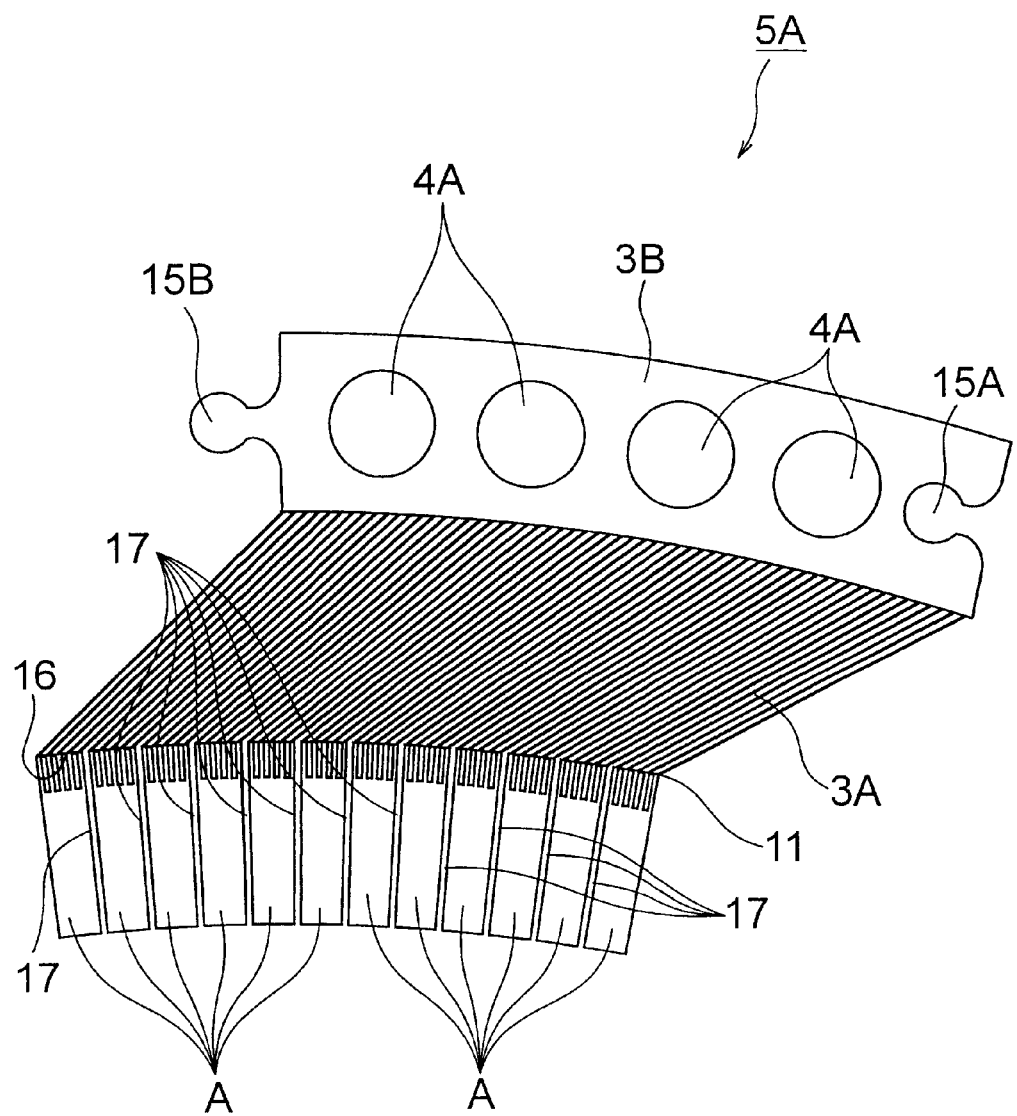
FIG. 4 is a plan view of first example of a cut-out modular plate constituting a brush seal unit relating to the present invention.

The cut-out modular plate 5A in FIG. 4 is formed by etching a number of the patterns (as shown in FIG. 4) that have been printed with a good yield on a thin plate having the thickness of 0.005 to 0.008 mm, thereby to form a modular plate 5 in FIG. 3.

Figure 6:
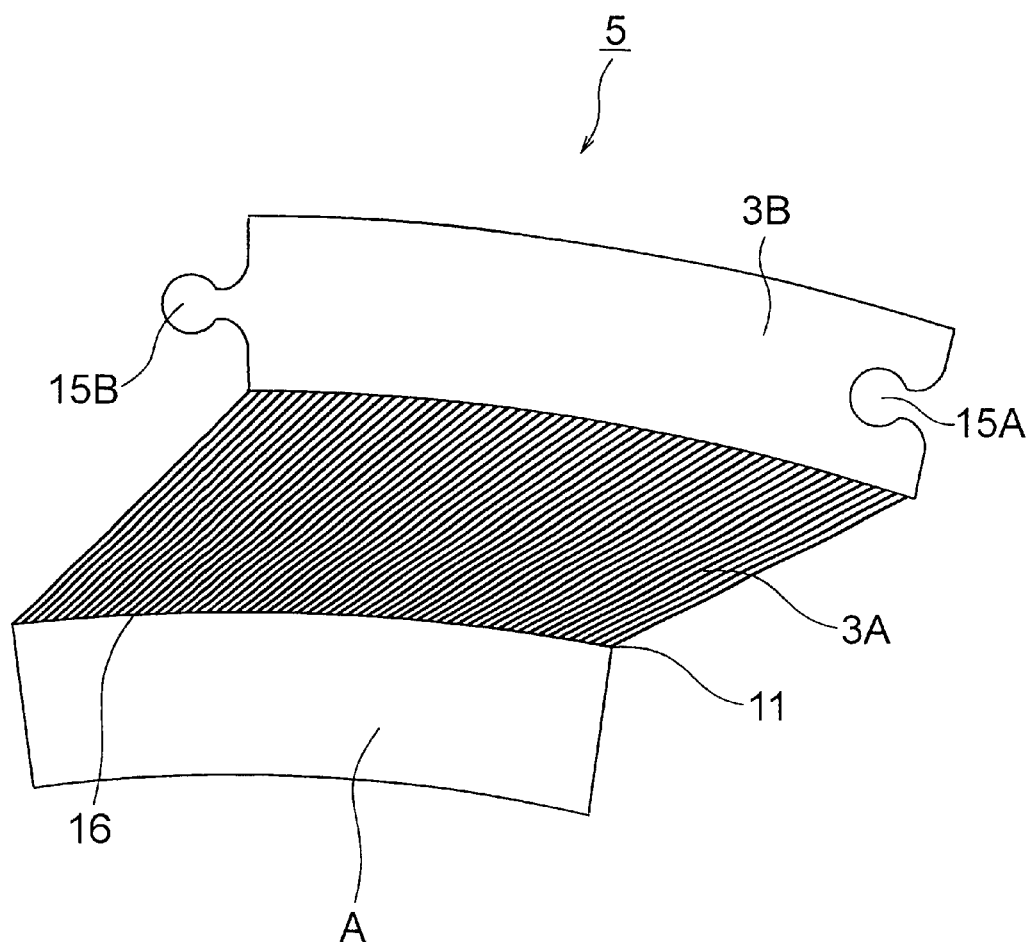
FIG. 6 is a plan view of second example of a cut-out modular plate constituting a brush seal unit relating to the present invention.

The description on this micro-fabrication process is omitted because it is known in general. The cut-out modular plate 5A is constituted with a modular plate 5 shown in FIG. 3 and twelve rectangular (seen in a plan view) ablative plate sections A integrally formed therewith at the free end 11 of the brush section 3A in the modular plate 5. In this constitution, the ablative plate sections A are formed by slitting such an ablative plate section in a body as shown in FIG. 6 with each ablative plate section A remaining to be connected with the brush section 3A. The purpose of slitting into plural ablative plates section A is to allow to break off them easily. For this purpose, the number of the ablative plates section A may be designed to be two or three.

At the boundary between the brush section 3A and each ablative plate section A is provided a break-off groove 16, the bottom wall thickness of which is made thin by half-etching process. The ablative plate sections A may be broken off for obtaining the modular plate 5 after the brush seal units 3 are piled to form the brush seal 2, or may be broken off when the brush seal 2 is installed to the rotor 60.

The time to remove the ablative plate sections A can be optionally determined in consideration of the possibility of the damages on the brush section 3A during installation work. By removing the ablative plate sections A shown in FIG. 4 from the cut-out modular plate 5A, the modular plate 5 shown in FIG. 3 is obtained.

Figure 5:
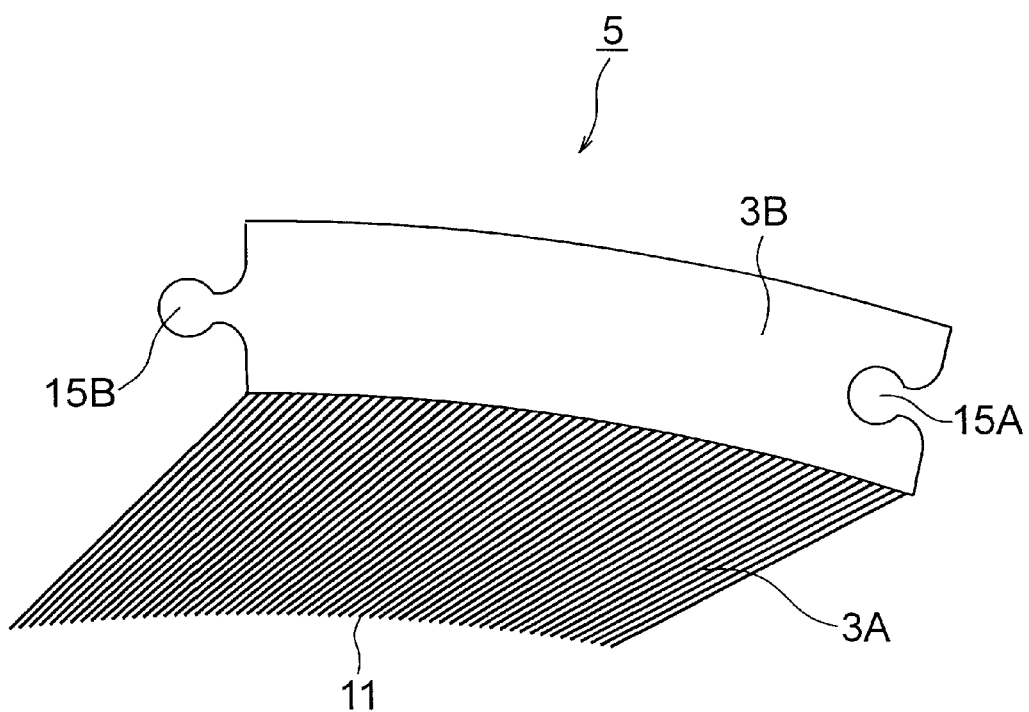
FIG. 5 is a plan view of second example of a modular plate constituting a brush seal unit relating to the present invention.

The cut-out modular plate 5A in FIG. 6 is almost same to the one as in FIG. 4 because both are constituted to function equally. It is a difference that the ablative plate section A of the former is one rectangular plate. At the boundary between the brush section 3A and the ablative plate section A is provided a break-off groove 16, the bottom wall thickness of which is made thin. Also, any positioning hole 4A is not formed in the base plate section 3B. The modular plate 5 in FIG. 5 is formed by removing the ablative plate section A from the cut-out modular plate 5A in FIG. 6.

The effect of forming into the modular plate 5 is that a number of modular plates 5 can be obtained from a thin plate with a good yield. Further, it is easy to install the brush seal 2 directly to the rotor 60 without removal of the rotor 60 from a main device.

Here, the method of assembling the brush seal 2 from the modular plates 5.

In order to assemble to constitute the brush seal 2 from the modular plates 5 shown in FIG. 3, a positioning hole 4 of the cut-out modular plate 5A in FIG. 4 is fitted to the positioning pin 7 fittingly fixed on the back plate section 6 and thus each cut-out modular plate 5A can be positioned. To this cut-out modular plate 5A positioned as a starting point are connected sequential cut-out modular plates 5A in order to form a brush seal unit 3 such that each of the connecting recess and projection 15 formed at the base plate section 3B is connected to ones in the next cut-out modular plate 5A. At this stage, each of the ablative plate sections A is broken off at the cut-off groove 16 and discarded (The ablative plate section A can be easily cut off by bending it at the cut-off groove 16.) Similarly, a next annular brush seal unit 3 is formed by coupling cut-out modular plates 5A in order by connecting each of the connecting recess and projection 15. At this stage, each ablative plate section A is broken off at the cut-off groove 16 as in the same manner described. Thus, the seal brush 2 is formed.

For the ablative plate sections A, the time to be broken off is not when the brush seal units having the ablative plate sections A are piled to form the brush seal 2 but when they are installed to the rotor 60. In such a way, the brush section 3A is prevented from being bent and damaged when it contacts other installed parts.

In this method of assembly, accurate positioning is secured because the positioning pin 7 contacts to fit the positioning hole 4. On the basis of this position, it is easy to couple the cut-out modular plates 5A in a sequential manner for assembling the brush seal unit 3. The placement for assembly is positioned precisely and the resultant brush seal 2 is highly accurate. Further, irregularity and distortion due to thermal deformation by welding is prevented because it is not required to weld the base plate section 3B to form the fixing section 20.

The cut-out modular plate 5A as second embodiment shown in FIG. 6 is also formed in the same way as in the first example described, such that the brush seal unit 3 is formed by coupling the cut-out modular plates 5A one by one with the connecting recess 15A formed at one end of its base plate section 3B to the connecting projection 15B of the next base plate section 15B and repeating those procedures sequentially. At the stage of completion of the brush seal unit 3, each ablative plate section A is bent to break off. The processes described are repeated to form the brush seal 2.

Figure 7:
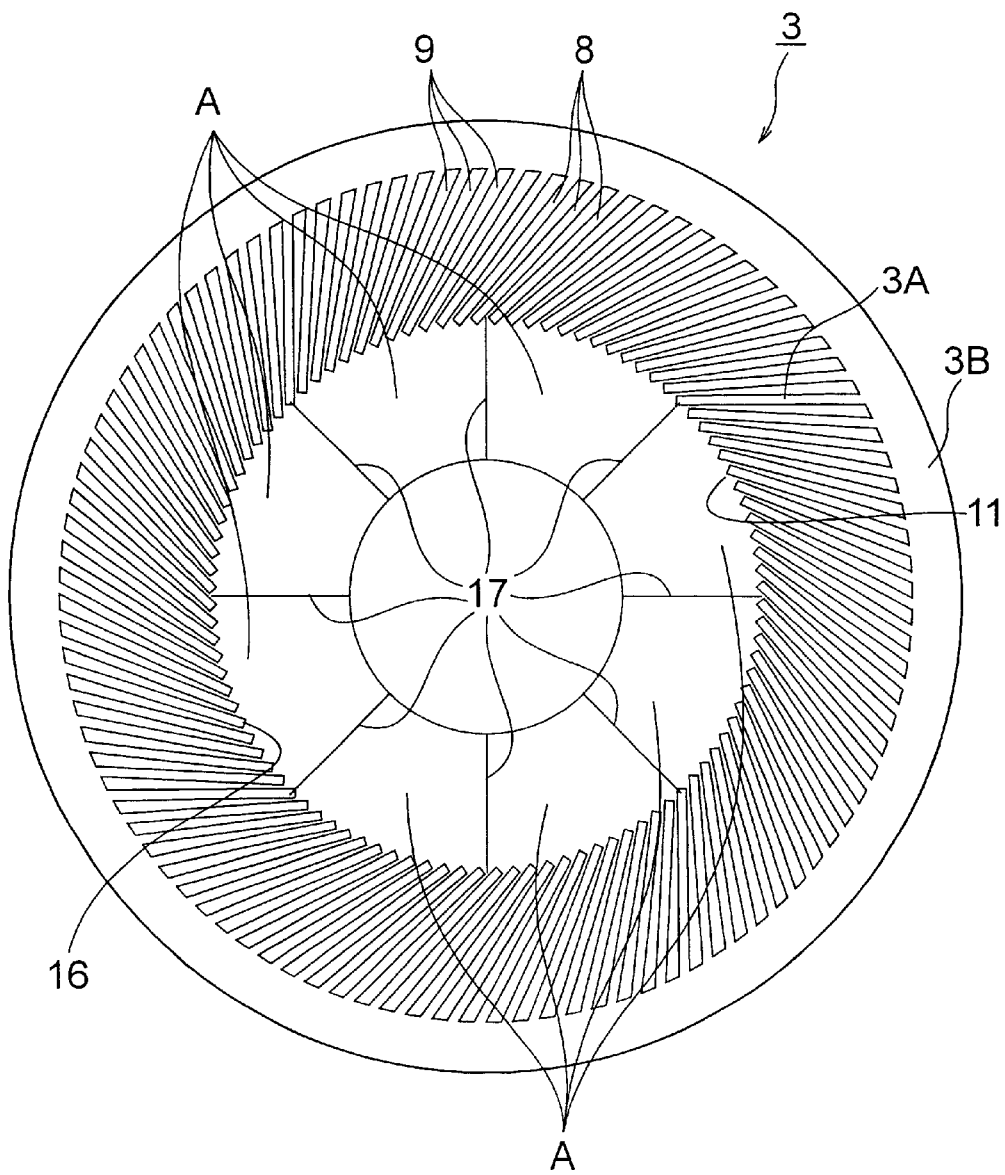
FIG. 7 is a plan view of second embodiment of a cut-out modular plate constituting a brush seal unit relating to the present invention.
Figure 8:
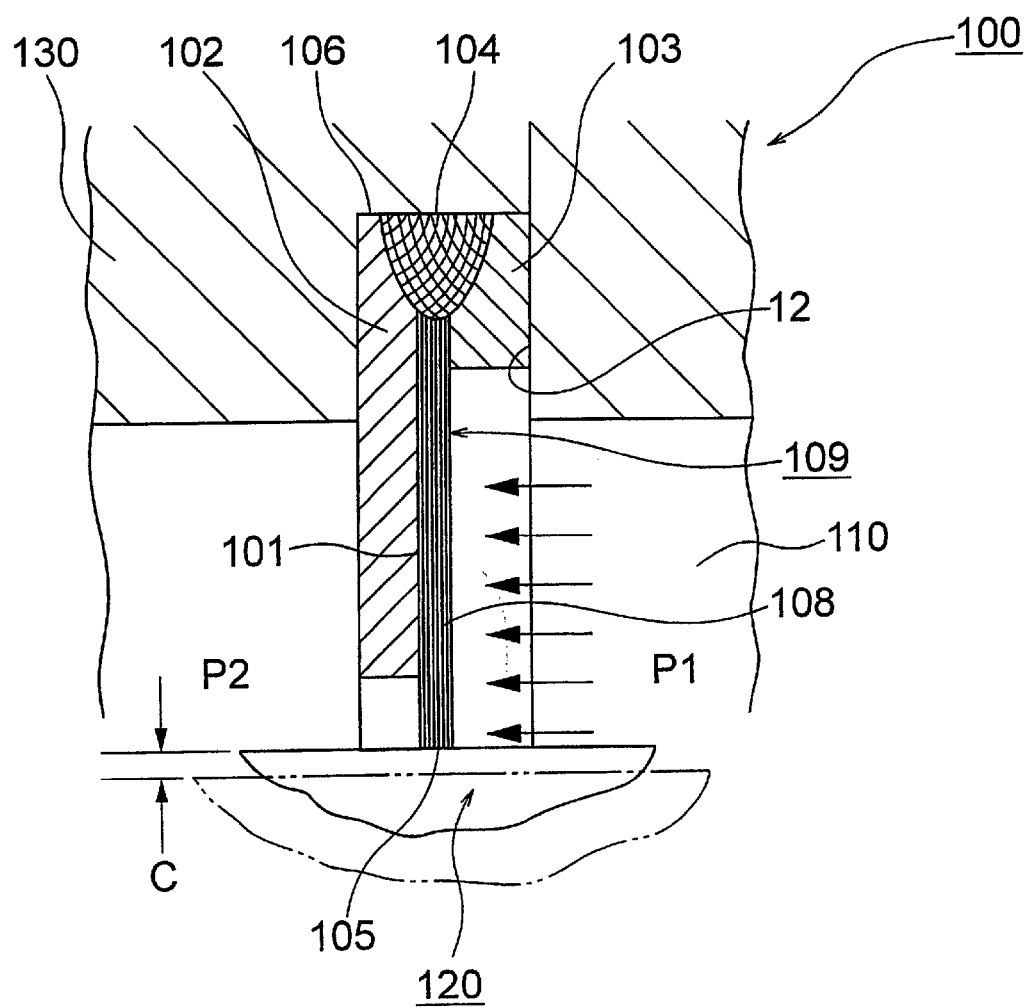
FIG. 8 is a sectional view, showing in half a conventional brush seal.
Figure 9:
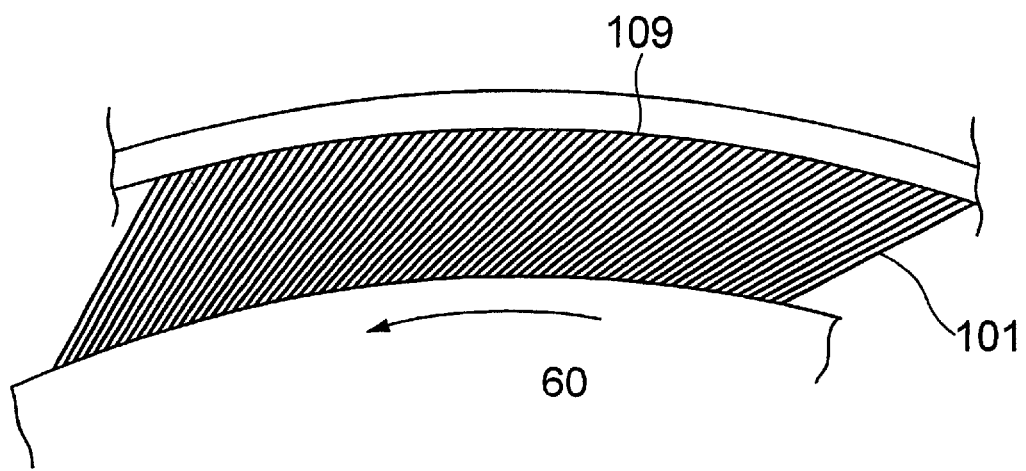
FIG. 9 is a partial plan view of a brush seal in FIG. 8.
Figure 10:
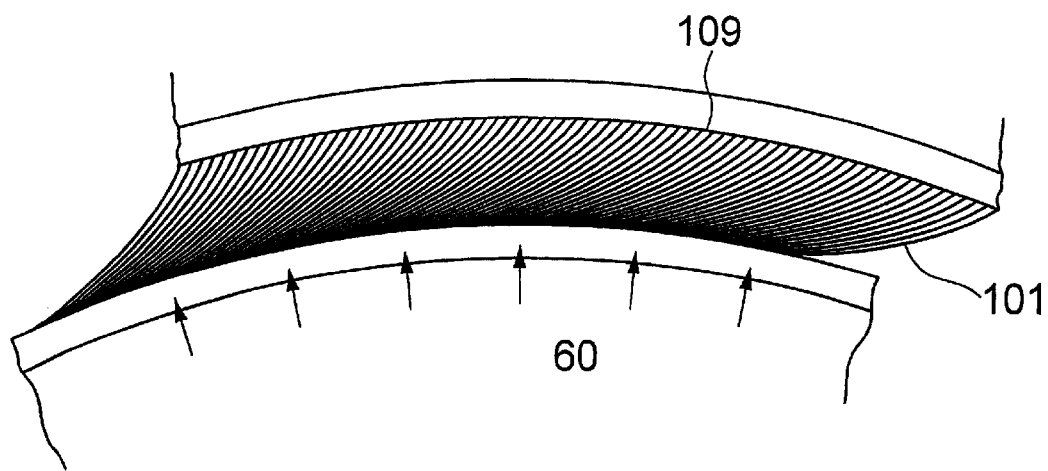
FIG. 10 is a partial plan view, showing a state that the rotor presses against the brush seal shown in FIG. 9.
Figure 11:
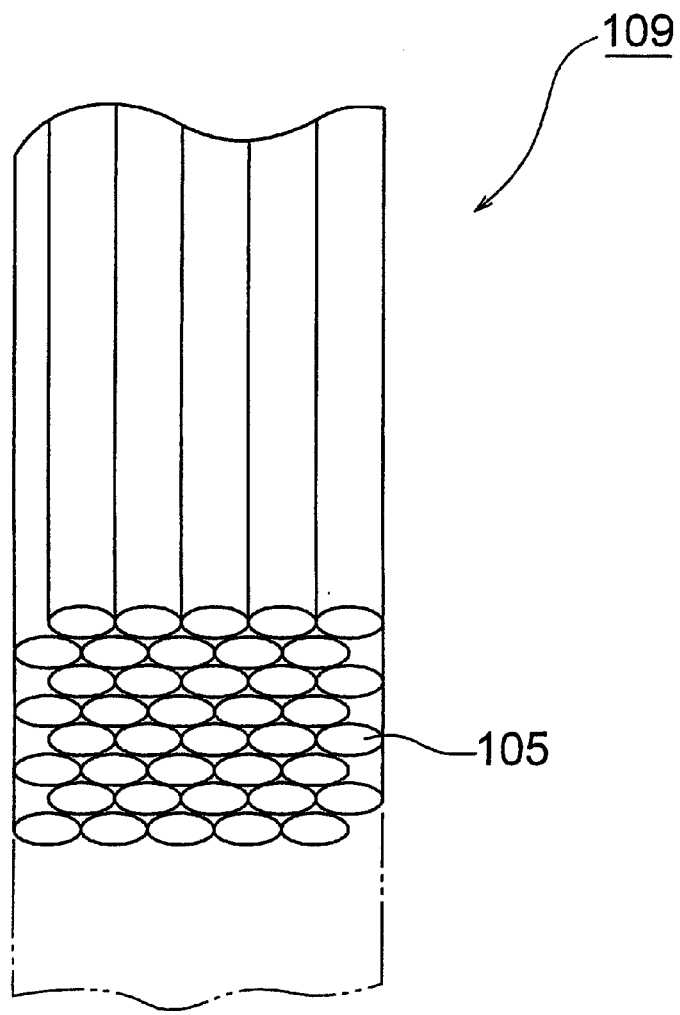
FIG. 11 is a perspective view of a conventional brush seal, seen from the circumferential side thereof.

FIG. 7 is a plan view, showing a brush seal unit of second embodiment related to the present invention. In FIG. 7, the brush seal unit 3 is formed in the shape shown in FIG. 7 by chemically etching a thin plate having the thickness of 0.005 mm. At the brush section 3A inside of the brush seal unit 3 are integrally formed therewith eight trapezoidal ablative plate sections A equally spaced via cuts 17. At the boundary between the brush section 3A and the ablative plate sections A is provided a break-off groove 16, the bottom wall thickness of which is made thin by half-etching process.

Those ablative plate sections A are broken off at the groove 16 when the brush seal units 3 are piled to form the brush seal 2. The cut-out modular plate 5A in such a complicated configuration is also allowed to be processed easily and precisely with micro-fabrication, such as etching process.

Other preferred embodiments according to the present invention will be described, hereinafter.

In a brush seal 2 of a second embodiment according to the present invention, the brush seal unit 3 includes a plurality of cut-out modular plates 5A connected each other through a connecting recess 15A provided at one end of the base plate section 3B and a corresponding connecting projection 15B provided at the other end of the base plate section 3A; and the cut-out modular plate 5A includes, at the free end 11 of the brush section 3A, an ablative plate section A integrally formed therewith.

In the brush seal 2 of the second embodiment according to the present invention, the yield of thin plate as the raw material can be extremely improved because each brush seal unit 3 is formed by coupling a plurality of cut-out modular plates 5A and therefore a larger brush seal unit 3 can be obtained by coupling the modular plates 5A one by one.

Additionally, at the free end 11 of the brush section 3A in the cut-out modular plate 5A is provided an ablative plate section A that are formed integrally therewith, through a break-off groove 16 for protecting the free end side of the brush section 3A. Thus, the damages on the brush section 3A can be effectively avoided during the ablative plate section A remains as it is. It is also easy to control the cut-out modular plates 5A when they are stored. During assembly work of the brush seal unit 3 from the cut-out modular plates 5A, any possible damages can be effectively avoided.

In the brush seal 2 of the third embodiment according to the present invention, the cut-out modular plate 5A includes a plurality of ablative plate sections A integrally formed at the free end 11 of the brush section 3A.

In the brush seal 2 of the third embodiment according to the present invention, the ablative plate sections A are separated along the slits 9 each other. When each ablative plate section A is to be removed from the cut-out modular plate 5A it is easy to break off the ablative plate section A to separate.

Especially, it is also expected to securely protect the brush section 3A from damages, because the ablative plate sections A can be bent to break off immediately before the completed brush seal 2 is built in the components.

Referring to the description above, as can be understood, following superior effects are expected.

According to the brush seal related to the first embodiment of the present invention, as the ablative plate section A is formed together with the free end 11 of the brush section 3A in the brush seal unit 3, the free end 11 of the brush section 3A is prevented from bending. The brush section 3A may contact another component during it is mounted, but the thin beam is effectively prevented from bending itself. As the break-off groove 16 having a thin bottom wall formed at the connection by half-etching process is provided, the brush seal unit 3 or the brush seal 2 may be assembled, during which the ablative plate section A is broken off at a predetermined time, such as when the brush seal units 3 are piled, or when the brush seal 2 is installed to the rotor 60. Furthermore, as the brush seal unit 3 is made from a thin sheet, high accuracy in fabrication can be achieved and it becomes easy to attach the brush seal 2.

According to the second embodiment related to the brush seal of the present invention, the yield of thin plate as the raw material is improved because each brush seal unit 3 is formed by coupling a plurality of cut-out modular plates 5A and therefore a larger brush seal unit 3 can be obtained by coupling the modular plates 5A one by one.

Additionally, the cut-out modular plate 5A is provided, at the brush section 3A thereof, with an ablative plate section A formed together therewith for protecting brush section 3A from damages. It is also easy to control the cut-out modular plates 5A when they are stored. During assembly work of the brush seal unit 3 from the cut-out modular plates 5A, any possible damages can be also effectively avoided.

According to the third embodiment related to the brush seal of the present invention, a plurality of ablative plate sections A are provided along the slits 9. When each ablative plate section A is to be removed from the cut-out modular plate 5A it is easy to break off the ablative plate section A to separate.

Especially, the brush section 3A can be protected from damages, because the ablative plate section A can be bent to break off immediately before the completed brush seal 2 is built in the components.

Having described specific embodiments of the invention , however, the descriptions of these embodiments do not cover the whole scope of the present invention nor do they limit the invention to the aspects disclosed herein, and therefore it is apparent that various changes or modifications may be made from these embodiments. The technical scope of the invention is specified by the claims.

What is claimed is:

1. A brush seal mounted on one of two relatively rotating components for sealing a clearance between said two components, said brush seal comprising:

a plurality of brush seal units, each brush seal unit having a strip-like brush section on a side facing the other component and having a base plate section on a side opposing said brush section, said brush section being formed with thin beams, each thin beam being provided between two slits, and said base plate section being fixed to the one component;

said each brush seal unit having an ablative plate section integrally formed at the free end of said brush section and a thin groove at a boundary between said brush section and said ablative plate section;

wherein said ablative plate section is broken off at said groove before mounting said brush seal between said two components.

2. A brush seal mounted on one of two relatively rotating components for sealing a clearance between said two components, said brush seal comprising:

a plurality of brush seal units, each brush seal unit having a strip-like brush section on a side facing the other component and having a base plate section on a side opposing said brush section, said brush section being formed with thin beams, each thin beam being provided between two slits, and said base plate section being fixed to the one component;

said each brush seal unit having an ablative plate section integrally formed at the free end of said brush section and a thin groove at a boundary between said brush section and said ablative plate section;

wherein said ablative plate section is broken off at said groove before mounting said brush seal between said two components, and wherein said brush seal unit includes a plurality of cut-out modular plates connected to each other through a connecting recess provided at one end of said base plate section and a corresponding connecting projection provided at the other end of said base plate section; and said cut-out modular plate includes, at the free end of said brush section, said ablative plate section integrally formed therewith.

3. A brush seal mounted on one of two relatively rotating components for sealing a clearance between said two components, said brush seal comprising:
- a plurality of brush seal units, each brush seal unit having a strip-like brush section on a side facing the other component and having a base plate section on a side opposing said brush section, said brush section being formed with thin beams, each thin beam being provided between two slits, and said base plate section being fixed to the one component;
- said each brush seal unit having an ablative plate section integrally formed at the free end of said brush section and a thin groove at a boundary between said brush section and said ablative plate section;
- wherein said ablative plate section is broken off at said groove before mounting said brush seal between said two components,
- wherein said brush seal unit includes a plurality of cut-out modular plates connected to each other through a connecting recess provided at one end of said base plate section and a corresponding connecting projection provided at the other end of said base plate section; and said cut-out modular plate includes, at the free end of said brush section, said ablative plate section integrally formed therewith, and
- wherein said cut-out modular plate includes a plurality of ablative plate sections integrally formed at the free end of said brush section, and said ablative plate sections are spaced via cuts, respectively.

* * * * *